UNITED STATES PATENT OFFICE.

RODOLPH GEIGY, OF BASLE, SWITZERLAND, ASSIGNOR TO JOHN R. GEIGY & CO., OF SAME PLACE.

PROCESS OF MAKING A VIOLET DYE.

SPECIFICATION forming part of Letters Patent No. 410,733, dated September 10, 1889.

Application filed March 5, 1889. Serial No. 301,892. (Specimens.)

*To all whom it may concern:*

Be it known that I, RODOLPH GEIGY, of Basle, Switzerland, have invented a new and Useful Process for the Production of a new Violet Coloring-Matter, of which the following is a specification.

My invention refers to the manufacture of a violet coloring-matter by the action of the chlorhydrate of nitroso-dimethylaniline upon gallamide.

In carrying out my invention practically I heat, for instance, twenty kilos of gallamide with thirty kilos of the chlorhydrate of nitroso-dimethylaniline in a solution of acetic acid. The coloring-matter formed separates after a short time in small greenish crystals. It is soluble in water with violet color, in acids with red color, and in alkalies with violet color. If the alkaline solution is poured into water, the base precipitates as an amorphous violet powder.

To make this coloring-matter applicable for printing, I transform it into its compound with bisulphite of soda. In dyeing, as well as in printing, it is fixed on the fiber by means of chrome or other mordants.

My product is soluble in water, but very difficult to dissolve in spirits, ether, and concentrated acetic acid. The base is an amorphous violet powder. The hydrochlorate of the coloring-matter forms small greenish crystals.

The empirical formula is:

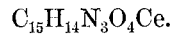

The chemical formula is:

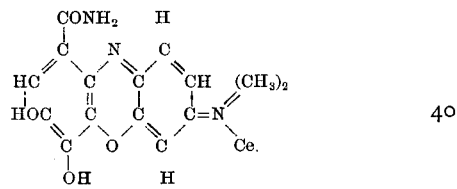

Having thus described my invention, what I claim as new, and desire to secure by Letters Patent, is—

The process for producing colors, consisting of heating twenty kilos of gallamide with thirty kilos of the chlorhydrate of nitroso-dimethylaniline in a solution of acetic acid, substantially as described.

In testimony whereof I hereunto sign my name, in the presence of two witnesses, this 18th day of February, 1889.

ROD. GEIGY.

Witnesses:
GEORGE GIFFORD,
CHAS. STAEHLIN.